United States Patent [19]
Stauffer et al.

[11] Patent Number: 5,971,710
[45] Date of Patent: Oct. 26, 1999

[54] TURBOMACHINERY BLADE OR VANE WITH A PERMANENT MACHINING DATUM

[75] Inventors: Bruce A. Stauffer, Scotland; Gilbert B. Wilcox, Somers, both of Conn.

[73] Assignee: United Technologies Corporation, Hartford, Conn.

[21] Appl. No.: 08/953,129

[22] Filed: Oct. 17, 1997

[51] Int. Cl.⁶ .................................................... B63H 1/26
[52] U.S. Cl. .......................... 416/191; 416/61; 416/189; 416/192; 416/223 A; 416/223 R; 416/248; 415/118; 415/173.1; 415/173.5; 415/173.6
[58] Field of Search ............................ 416/61, 189, 191, 416/192, 223 A, 223 R, 248; 415/118, 173.1, 173.4, 173.5, 173.6; 29/889.1, 889.7

[56] References Cited

U.S. PATENT DOCUMENTS

| | | | |
|---|---|---|---|
| 4,576,551 | 3/1986 | Oliviver et al. | 416/191 |
| 5,288,209 | 2/1994 | Therrien et al. | 416/193 R |
| 5,544,873 | 8/1996 | Vickers et al. | 269/47 |

Primary Examiner—Edward K. Look
Assistant Examiner—Ninh Nguyen
Attorney, Agent, or Firm—Kenneth C. Baran

[57] ABSTRACT

A turbine blade (18) for a gas turbine engine includes a machining datum (60) that extends radially from a pocket (54) in the outer shroud (36) of the blade. The datum is spaced from a sidewall (64) of the pocket so that the datum is peripherally continuous irrespective of whether the blade is in a prefinished state or in a completely finished state. Because the datum's peripheral continuity survives the original manufacturing process, the datum is available for use in post-manufacturing inspection and repair operations.

11 Claims, 4 Drawing Sheets

TURBOMACHINERY BLADE OR VANE WITH A PERMANENT MACHINING DATUM

TECHNICAL FIELD

This invention relates to turbomachinery blades and vanes and particularly to a blade or vane having a machining datum that survives the original manufacturing process so that the datum is available for use in post-manufacturing inspection and repair operations.

BACKGROUND OF THE INVENTION

Gas turbine engines and similar turbomachines have one or more compressors and turbines. The compressors and turbines include longitudinally alternating arrays of blades and vanes that extend radially across an annular flowpath. During operation of the turbomachine, a working medium fluid flows longitudinally through the flowpath. The blades and vanes interact with the working medium fluid to transfer energy from the compressor to the fluid and from the fluid to the turbine.

A typical turbine blade has a root that adapts the blade to be secured to a rotatable hub so that the blade extends radially outwardly from the hub. The blade also includes a platform adjacent to the root, a shroud radially spaced apart from the platform and an airfoil extending between the platform and the shroud. A knife edge extends outwardly from the radially outer surface of the shroud. When a full complement of blades is secured to the hub of a turbomachine to form a blade array, the blade platforms and shrouds define radially inner and outer boundaries of a flowpath for the working medium fluid, and the airfoils extend radially across the flowpath. In addition, the knife edges of the installed blades abut each other to form a substantially circumferentially continuous knife edge ring. The knife edge ring extends radially toward an abradable seal that circumscribes the blade array. Over the course of a brief break-in period early in the life of a newly manufactured turbomachine (or after an engine has been refurbished with a new abradable seal) mechanical deflections and thermally induced dimensional changes cause the knife edge ring to cut a corresponding knife edge groove into the abradable seal. Thereafter, the engine operates with the knife edge ring protruding snugly into the knife edge groove thereby forming a seal that minimizes the leakage of working medium fluid past the blade array.

The turbine blades are made from a high strength, temperature tolerant alloy that is cast to a near net shape. The blade casting is then polished to smooth out any minor irregularities in the airfoil surface and to remove any excess material from the airfoil's leading and trailing edges. The blade platform and shroud are then finish machined to render the blade dimensionally and geometrically suitable for installation and service in the turbomachine.

The finish machining of the platform and shroud is conducted according to a highly automated manufacturing protocol known as "one piece flow". This protocol features a sequence of machines arranged in a logistically optimized flow line in a manufacturing facility. Each machine performs one of several required machining steps, and operates on only one blade at a time. Each blade is transferred from machine to machine in the flow line. In order to guard against the accumulation of machining inaccuracies due to these transfers of the blade from one machine to the next in the machining sequence, the blade has a set of dedicated, highly accurate machining datums.

One of the dedicated datums is a machining projection that extends radially outwardly from the shroud. The projection has a radially inner portion that is recessed in a pocket in the shroud outer surface and blends into a pocket sidewall so that the radially inner portion is peripherally noncontinuous. The projection also has a radially outer portion that extends radially beyond the sidewall and therefore is peripherally continuous. The peripherally continuous outer portion serves not only as a reference point but also as one of a number of interfaces by means of which the blade can be predictably positioned and anchored in place in each of the one piece flow machines.

If such a blade were to be installed in a turbomachine, the outer portion of the projection would cut into the seal that circumscribes the blade array in much the same way that the knife edge ring cuts into the seal. Because the knife edge ring and the projection are separated by only a small distance, and because the hub shifts slightly in the longitudinal direction during engine operation, the cut made by the projection can merge with and expand the width of the knife edge groove. As a result the desired snug fit between the knife edge ring and the knife edge groove is undermined thereby diminishing the effectiveness of the seal and reducing the turbomachine's efficiency. To guard against this occurrence, the outer portion of the projection is machined off, leaving behind only the inner portion, which is too short to contact the seal. The removal of the outer portion also destroys the projection's utility as a datum, and therefore the outer portion is not removed until all the other machining operations are complete and the projection is no longer necessary to facilitate blade manufacture.

Turbine blades, such as those just described, must also undergo post-manufacturing dimensional inspections. The above described machining projection would be an ideal inspection reference point. However since the projection is not available as a reference in the post-manufacturing environment, it is common practice to rely on alternative reference points. These alternative references are two sets of datum triplets on the airfoil, one set near the platform and one near the shroud. These datum triplets are far less accurate than the machining projection, and therefore overly stringent inspection criteria must be established to ensure that all dimensionally unacceptable blades are identified. As a result, some airfoils that are dimensionally acceptable will be identified as unacceptable, and will be scrapped. Given the high cost of turbomachinery blades it is clearly desirable to minimize the likelihood that a serviceable blade is erroneously identified as unacceptable.

A similar difficulty arises when damaged or deteriorated blades are refurbished to extend their serviceability. The absence of the machining projection forces reliance upon less accurate datums, and as a result it may not be possible to realize the full potential of the refurbishment.

SUMMARY OF THE INVENTION

It is, therefore, an object of the invention to provide a turbine blade or vane with a survivable machining datum so that post manufacturing inspection and refurbishment can be carried out with the degree of accuracy and confidence enjoyed during the original manufacturing process.

According to the invention, a turbomachinery blade or vane, generically referred to herein as fluid reaction elements, has a radially extending machining datum that is peripherally continuous for at least a minimum distance irrespective of whether the blade is in a prefinished state or in a completely finished state.

According to one aspect of the invention, the datum is a substantially conical projection. According to another aspect of the invention, the machining datum of the finished blade resides in a pocket where it is protected from damage that could arise from careless handling.

In one detailed embodiment of the invention, a turbomachinery blade comprises a platform, a shroud, an airfoil extending therebetween, and a conical machining datum extending radially outwardly from a pocket in the shroud. The blade has a prefinished state in which the datum is peripherally continuous over a predefined distance and a finished state in which the datum is peripherally continuous over a reduced distance, the reduced distance nevertheless being sufficient for the datum to serve as a reference and anchoring feature during machining.

The invention is advantageous in that the peripheral continuity of the datum transcends the manufacturing process so that post-manufacturing inspection and repair procedures can be carried out with the same degree of accuracy as the original manufacturing operations. As a result, blade scrap rates can be minimized and the full potential of refurbishment operations can be realized.

The foregoing features and advantages and the operation of the invention will become more apparent in light of the following description of the best mode for carrying out the invention and the accompanying drawings.

BEST MODE FOR CARRYING OUT THE INVENTION

Figure 1:
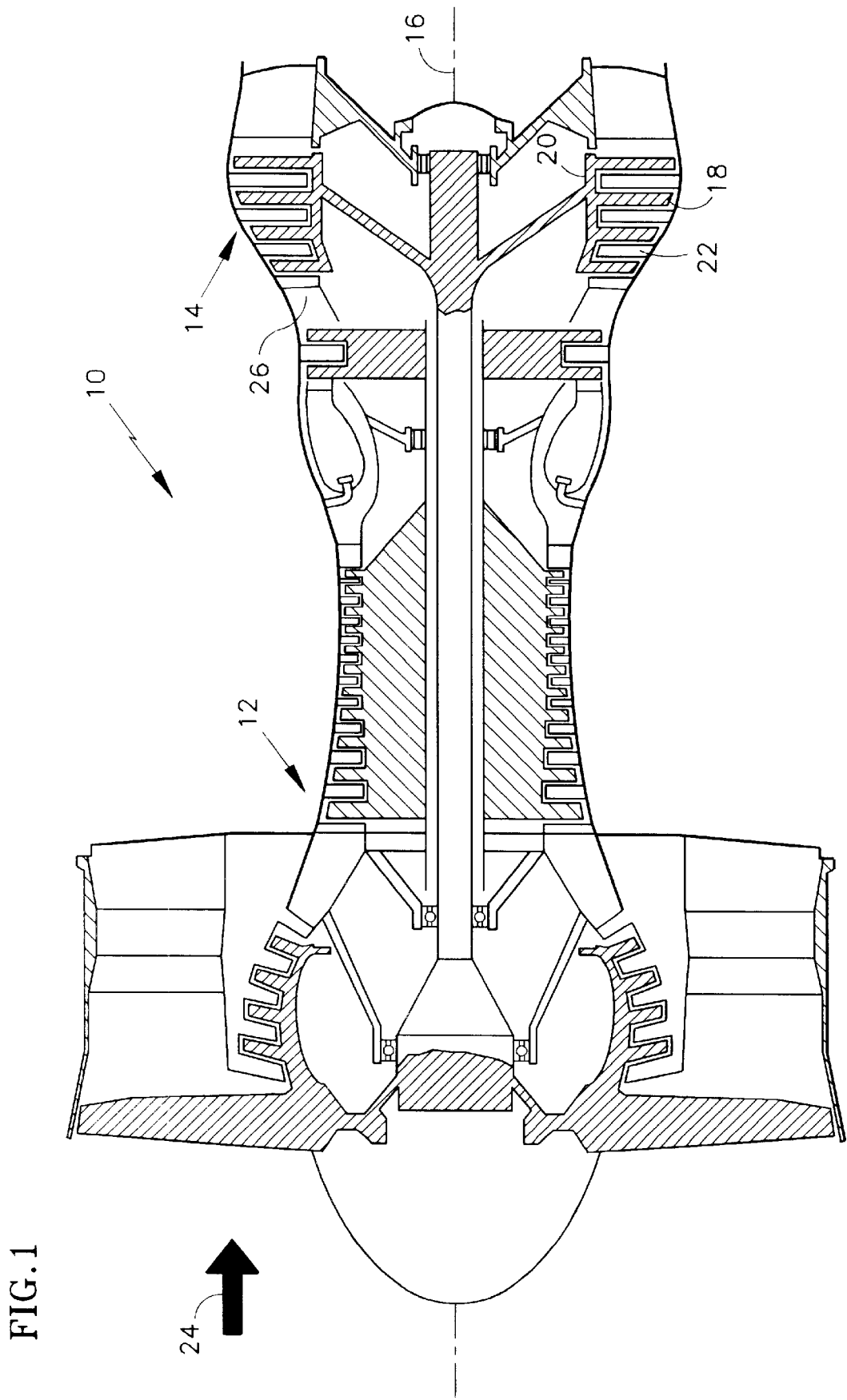
FIG. 1 is a schematic side view of a turbofan gas turbine engine.

Referring to FIG. 1, a turbomachine, exemplified by gas turbine engine 10 includes one or more compressors 12, and one or more turbines 14 disposed about a longitudinally extending central axis 16. The compressors and turbines include one or more arrays of blades, such as low pressure turbine blade 18, extending radially outwardly from a rotatable hub 20, and one or more arrays of nonrotatable, radially extending vanes such as turbine vane 22. During engine operation, a working medium fluid 24 flows longitudinally through an annular flowpath 26 and interacts with the blades and vanes to exchange energy with the compressors and turbines.

Figure 2:
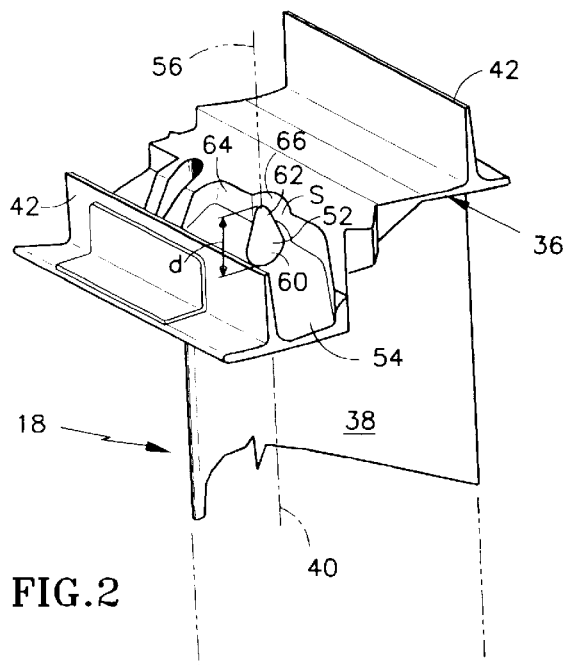
FIG. 2 is a perspective view of a turbine blade according to the present invention shown in a prefinished state and illustrating a machining datum extending radially outwardly from a shroud.
Figure 3:
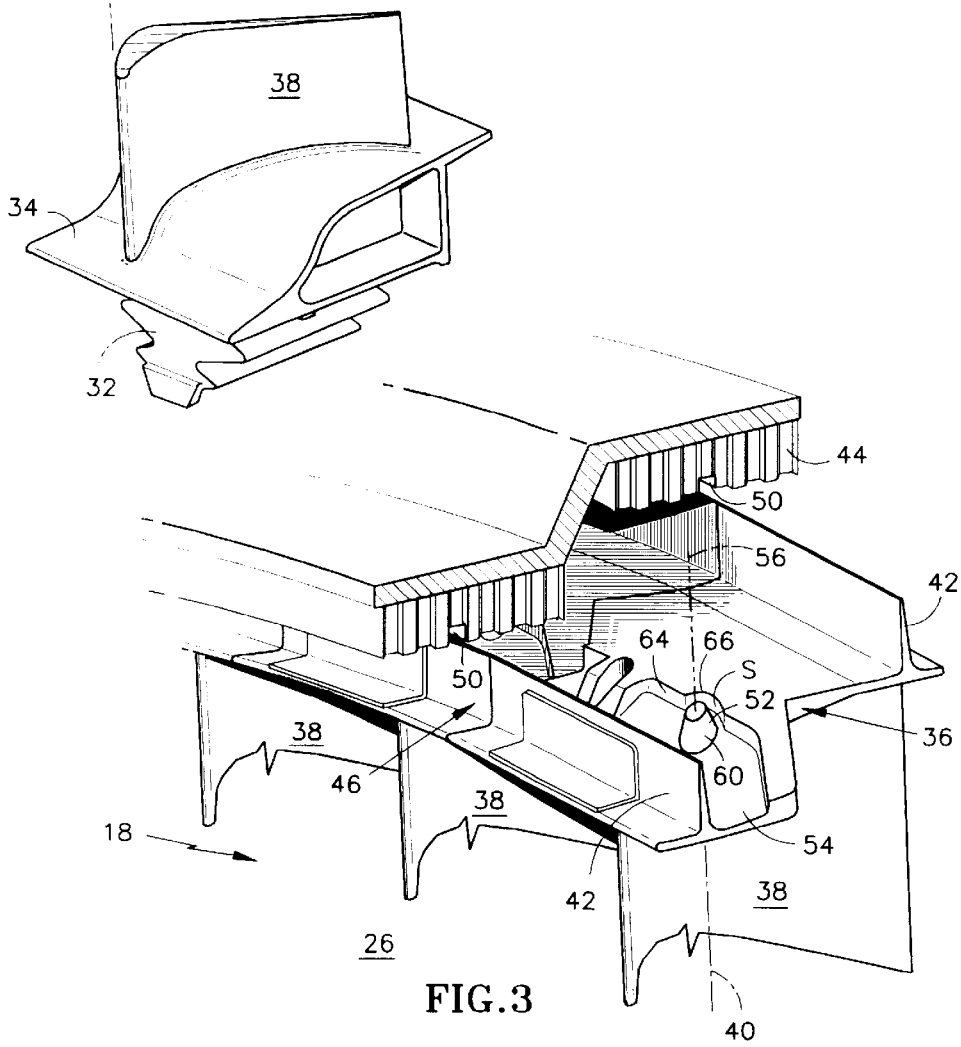
FIG. 3 is a view similar to that of FIG. 2 showing the radially outer end of the blade in its finished state, the blade being illustrated in relation to other blades of a turbine blade array and in relation to an abradable seal that circumscribes the array.
Figure 4:
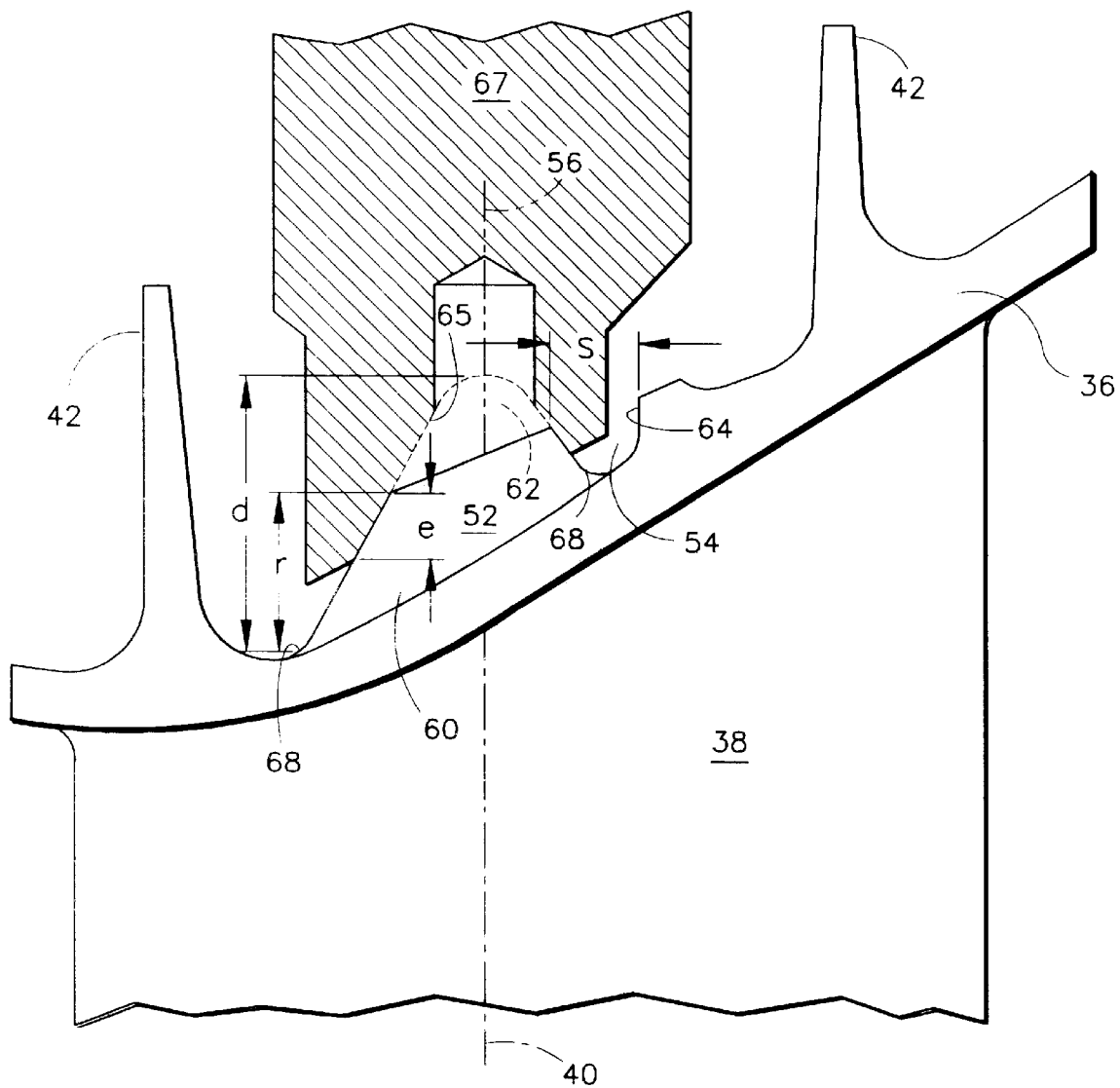
FIG. 4 is a side view of the blade of FIG. 3 with a sacrificial tip portion of a machining datum shown in phantom, and also showing a fixturing tool engaging the machining datum.

Referring now to FIGS. 2, 3 and 4, turbine blade 18 includes a root 32, a platform 34 adjacent to the root, a shroud 36 and an airfoil 38 extending between the root and the shroud. An intangible stacking line 40 extends alongside the airfoil and is used as a reference for establishing the airfoil's contour as well as its spatial position relative to the platform and shroud. The blade as illustrated in FIG. 2 is in a prefinished state, i.e. the shroud and platform have not been finish machined to render the blade suitable for installation in the engine. The blade as depicted in FIG. 3 (and in FIG. 4 except for the feature illustrated in phantom) is in a finished state, i.e. the shroud and platform have been finish machined so that the blade is geometrically and dimensionally suitable for installation.

The blade shroud 36 includes a pair of knife edges 42, each of which extends radially outwardly toward an abradable seal 44 that circumscribes the blade array. Each knife edge also extends circumferentially and abuts the knife edges of the adjacent blades in the array to form a substantially continuous, circumferentially extending knife edge ring 46. When the engine is initially assembled, the knife edge ring does not contact the seal. However during a brief break-in period when the engine is first operated at high power, mechanical deflections and thermally induced dimensional changes cause each knife edge ring to cut a knife edge groove 50 into the seal. Thereafter, the ring protrudes into the groove during high power operation to form a barrier against the leakage of working medium fluid past the blade array.

The blade also includes a machining datum 52 that extends radially outwardly from a pocket 54 in the shroud. The datum has an axis 56 that is substantially coincident with the stacking line 40. In the prefinished state (FIG. 2) the datum is a substantially conical projection comprising a frustum or base portion 60 and a tip portion 62 integral with the base. The datum extends from the shroud for a predefined distance d so that the datum is partially recessed in the pocket 54. The datum is also spaced a distance s from a wall 64 of the pocket so that the datum is peripherally continuous, and therefore can be embraced by an opening 65 in one end of a fixturing tool 67, over at least a portion of the distance d. The distance d is sufficiently long that the fixturing tool can reliably anchor and position the blade in the one piece flow machines during machining operations.

In the fully finished state (FIGS. 3, 4) the blade has been machined so that it is geometrically and dimensionally suitable for service in an engine. The final machining operation shaves off the tip 62 of the datum, leaving behind only the base 60 so that the datum extends only a reduced distance r from the shroud and is substantially entirely recessed in the pocket 54. Because the datum is spaced apart from the pocket wall, the datum is still peripherally continuous over the reduced distance r. The reduced distance r is at least the minimum distance sufficient for the datum to serve as a support feature during machining operations. The actual tool engagement distance, e is limited by fillet region 68 of the datum and therefore is less than r. The datum therefore retains its utility as both a reference point and as a support feature. Thus, any post manufacturing inspections and repairs can benefit from the datum. Moreover, because the datum is recessed in the pocket 54, the datum is protected from damage that can occur during handling.

Figure 5:
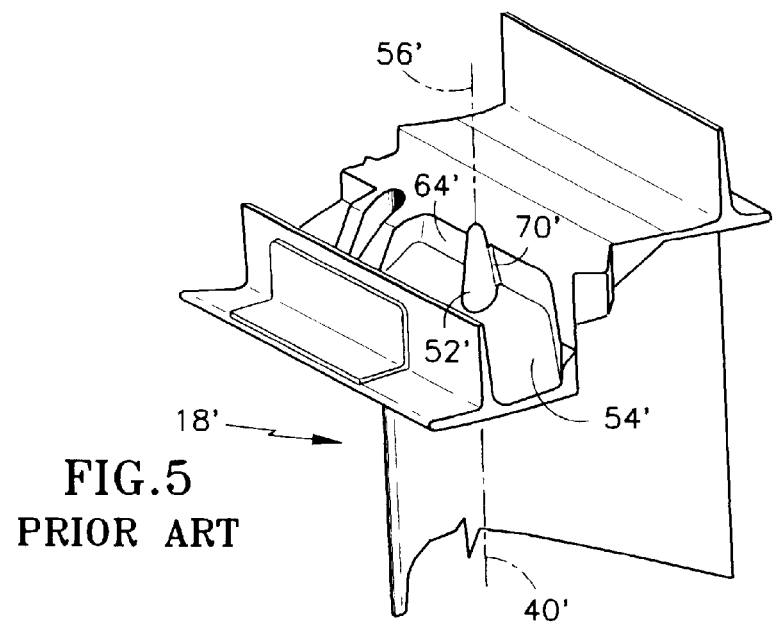
FIGS. 5 and 6 are perspective views of the radially outer end of a prior art turbine blade in its prefinished state and finished state respectively.
Figure 6:
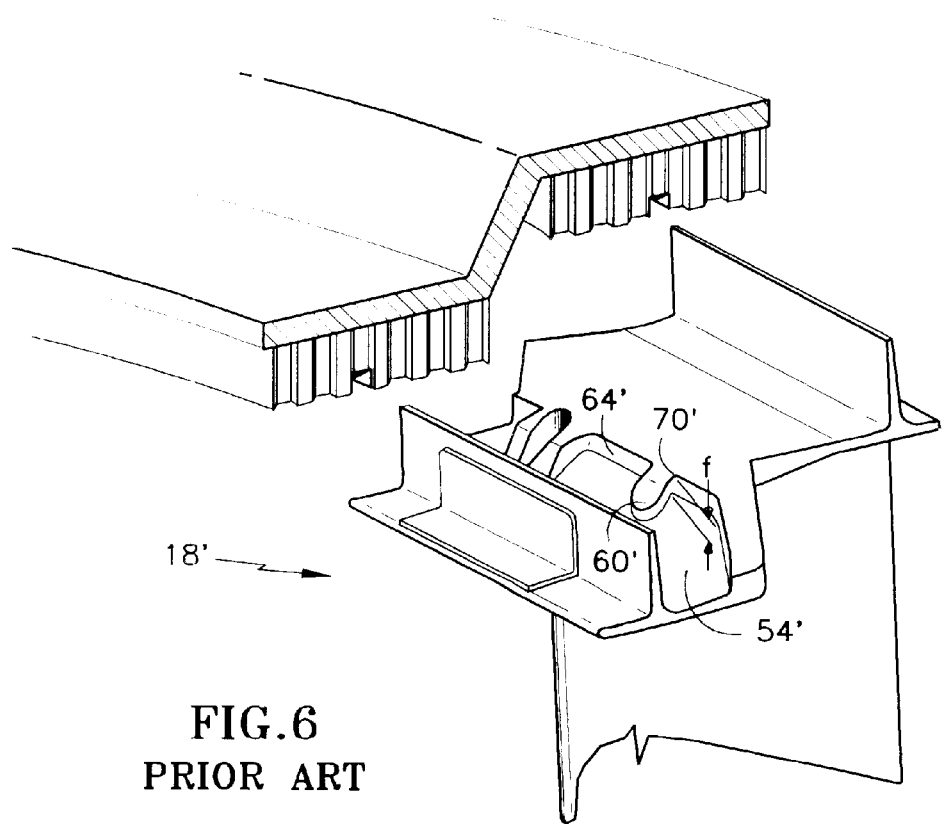

The invention can be better appreciated in comparison with a prior art blade 18' shown in FIG. 5 (prefinished state) and FIG. 6 (finished state). The blade has a datum 52' whose axis 56' is coincident with the airfoil stacking line 40'. As seen in the figures, the datum 52' of the prior art blade blends into the sidewall 64' of the pocket 54'. The blend region 70' interrupts the peripheral continuity of the datum over a fraction f of the datum's length. Although the datum is useful in the prefinished state, the final machining operation leaves behind only a peripherally noncontinuous inner portion or stub 60', thereby destroying the datum's utility for post-manufacturing operations.

A comparison of the blades illustrated in FIGS. 3 and 6 shows that the peripheral continuity of the datum, in the finished state, has been ensured by introducing a scallop 66 into the sidewall 64 of the pocket. Accordingly, the datum axis 56 remains coincident with the stacking line 40. Alternatively, peripheral continuity could have been preserved by positioning the datum elsewhere in the pocket, but nevertheless spaced from the sidewall, so that the datum axis and stacking line are noncoincident. The former approach is preferred since the angular orientation of the blade with respect to its stacking line is not the same in each of the machines of the one piece flow line. If the datum is not coincident with the stacking line, the position of the datum is orientation dependent, which complicates the fixturing tools for the machines in the line—i.e. each machine's fixturing tools must be customized to the spatial location of the datum. However if the datum axis coincides with the stacking line, the datum's position in space is independent of the blade's angular orientation, thereby simplifying the tooling.

The invention is not limited to the above described embodiment. For example, although the invention has been described with reference to a turbine blade, it can be readily applied to any turbomachinery vane or blade. Moreover the datum need not be conical, but may be of any useful shape. These and other changes, modifications and adaptations can be made without departing from the invention as set forth in the accompanying claims.

We claim:

1. A fluid reaction element for a turbomachine, the fluid reaction element having a prefinished state and a finished state, the fluid reaction element also having a machining datum extending therefrom, the machining datum being physically altered by machining operations that transform the fluid reaction element from the prefinished state to the finished state, the machining datum also being peripherally continuous for at least a minimum distance in both the prefinished state and in the finished state.

2. The fluid reaction element of claim 1 wherein the datum in the prefinished state is substantially conical, and in the finished state is a frustum.

3. The fluid reaction element of claim 1 wherein the minimum distance is sufficiently long for the datum to serve as a support feature during machining operations.

4. The fluid reaction element of claim 1 wherein the element is a blade adapted to be secured to a hub so that the blade extends radially outwardly from the hub, the blade comprising a platform for defining a segment of the radially inner boundary of an annular working medium flowpath, a shroud for defining a segment of the radially outer boundary of the flowpath, and an airfoil extending between the platform and the shroud, and wherein the datum extends radially outwardly from the shroud.

5. The fluid reaction element of claim 4 wherein the airfoil has a radially extending stacking line and the machining datum has an axis substantially coincident with the stacking line.

6. The fluid reaction element of claim 1 wherein the machining datum is at least partially recessed in a pocket in the prefinished state and is substantially entirely recessed in the pocket in the finished state.

7. A turbomachinery blade adapted to be secured to a hub so that the blade extends radially outwardly from the hub, the blade comprising a platform for defining a segment of the radially inner boundary of an annular working medium flowpath, a shroud for defining a segment of the radially outer boundary of the flowpath, an airfoil extending between the platform and the shroud, and a machining datum extending radially outwardly from the shroud, the blade having a prefinished state in which the machining datum extends from the shroud for a predefined distance and is peripherally continuous over at least a portion of the predefined distance, the blade also having a finished state in which the machining datum extends from the shroud for a reduced distance and is peripherally continuous over the reduced distance, the reduced distance being sufficient for the datum to serve as a support feature during machining operations.

8. The turbomachinery blade of claim 7 wherein the datum in the prefinished state is substantially conical and in the finished state is a frustum.

9. The turbomachinery blade of claim 7 wherein the airfoil has a radially extending stacking line and the machining datum has an axis substantially coincident with the stacking line.

10. The turbomachinery blade of claim 7 wherein the machining datum is at least partially recessed in a pocket in the prefinished state and is substantially entirely recessed in the pocket in the finished state.

11. A fluid reaction element for a turbomachine, the fluid reaction element having a prefinished state and a finished state, the fluid reaction element also having a machining datum extending therefrom, the machining datum being peripherally continuous for at least a minimum distance in both the prefinished state and in the finished state and wherein the datum is substantially conical in the prefinished state and is a frustum in the finished state.

* * * * *